US008886983B2

(12) United States Patent
Matton et al.

(10) Patent No.: US 8,886,983 B2
(45) Date of Patent: *Nov. 11, 2014

(54) SYSTEM AND METHOD FOR PORTABLE POWER SOURCE MANAGEMENT

(71) Applicant: BlackBerry Limited, Waterloo (CA)

(72) Inventors: Maxime Matton, Waterloo (CA); Puvikumar Sinnathamby, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,580

(22) Filed: Nov. 27, 2012

(65) Prior Publication Data

US 2013/0086406 A1 Apr. 4, 2013

Related U.S. Application Data (63) Continuation of application No. 13/108,860, filed on May 16, 2011, now Pat. No. 8,332,677, which is a continuation of application No. 11/777,092, filed on Jul. 12, 2007, now Pat. No. 7,945,797.

(51) Int. Cl.
*G06F 1/32* (2006.01)

(52) U.S. Cl.
USPC .......................................... 713/324; 713/320

(58) Field of Classification Search
None
See application file for complete search history.

(56) References Cited

U.S. PATENT DOCUMENTS

| | | | |
|---|---|---|---|
| 5,560,022 A | 9/1996 | Dunstan | |
| 6,031,999 A | 2/2000 | Ogawa | |
| 6,329,794 B1 | 12/2001 | Oeda et al. | |
| 6,802,014 B1 | 10/2004 | Suurballe | |
| 7,584,376 B2 | 9/2009 | Finkelstein et al. | |
| 2003/0160702 A1 | 8/2003 | Tanaka | |

(Continued)

FOREIGN PATENT DOCUMENTS

| | | |
|---|---|---|
| EP | 1679576 A2 | 7/2006 |
| GB | 2412257 A | 9/2005 |
| WO | 0209254 A2 | 1/2002 |
| WO | 0246895 A2 | 6/2002 |

OTHER PUBLICATIONS

Matton, Maxine, U.S. Appl. No. 11/777,099; "System and Method for Portable Power Source Management"; filed Jul. 12, 2007.

(Continued)

*Primary Examiner* — Dennis M Butler
(74) *Attorney, Agent, or Firm* — Conley Rose, P.C.; J. Robert Brown, Jr.

(57) ABSTRACT

A battery monitoring apparatus that senses battery conditions such as low battery charge, end of battery capacity, and end of battery life, and responds by taking actions such as sending messages to a remote site and/or powering down. A rechargeable battery is coupled to one or more power-consuming electrical components, including battery monitoring equipment. The battery monitoring equipment senses battery charge. In response to a low-battery-charge condition, the battery monitoring equipment transmits a battery status message to a remote site and powers-down some of the electrical components. Whenever the battery nears the end of its capacity, the monitoring equipment powers down all electronic components and awaits the application of external power. The invention also tracks the time required for the battery charge to deplete. Charge duration decreases over time, and whenever it reaches a predetermined minimum, the battery monitoring equipment transmits a representative status message to the remote site.

20 Claims, 4 Drawing Sheets

(56) References Cited

U.S. PATENT DOCUMENTS

| | | | |
|---|---|---|---|
| 2005/0125703 A1* | 6/2005 | Lefurgy et al. | 713/320 |
| 2005/0231042 A1 | 10/2005 | Kephart | |
| 2006/0179335 A1 | 8/2006 | Jang | |
| 2009/0054100 A1 | 2/2009 | Ishida | |

OTHER PUBLICATIONS

Office Action dated Mar. 29, 2010; 14 pages; U.S. Appl. No. 11/777,099, filed Jul. 12, 2007; 14 pgs.

Final Office Action dated Sep. 16, 2010; 11 pages; U.S. Appl. No. 11/777,099, filed Jul. 12, 2007; 11 pgs.

Notice of Allowance dated Jan. 11, 2011; 4 pages; U.S. Appl. No. 11/777,099, filed Jul. 12, 2007; 4 pgs.

EP Search and Examination Report; EP Application No. 07113398; Feb. 15, 2008; 10 pgs.

Second EP Search and Examination Report; EP Application No. 07113398.7; Nov. 27, 2008; 8 pgs.

Canadian Office Action; Canadian Patent Application No. 2,636,908; Aug. 19, 2010; 4 pgs.

SIPO, Chinese First Office Action; Chinese Patent Application No. 200810135821.0; Feb. 25, 2010; 18 pgs.

Matton, Maxine, U.S. Appl. No. 13/108,860; "System and Method for Portable Power Source Management"; filed May 16, 2011.

Interview Summary dated Nov. 15, 2010; U.S. Appl. No. 11/777,092, filed Jul. 12, 2007; 3 pages.

Office Action dated Jan. 26, 2012; U.S. Appl. No. 13/108,860, filed May 16, 2011; 23 pages.

Final Office Action dated Jun. 4, 2012; U.S. Appl. No. 13/108,860, filed May 16, 2011; 5 pages.

Notice of Allowance dated Aug. 9, 2012; U.S. Appl. No. 13/108,860, filed May 16, 2011; 9 pages.

Canadian Office Action; Application No. 2,636,908; Aug. 17, 2011; 2 pages.

Chinese Office Action; Application No. 200810135821.0; May 25, 2011; 11 pages.

Chinese Third Office Action; Application No. 200810135821.0; Sep. 29, 2011; 18 pages.

Chinese Office Action; Application No. 200810135821.0; Apr. 5, 2012; 18 pages.

European Summons to Attend Oral Proceedings; Application No. 07113398.7; Aug. 16, 2013; 9 pages.

* cited by examiner

SYSTEM AND METHOD FOR PORTABLE POWER SOURCE MANAGEMENT

BACKGROUND

As more computing power and new functions are added to mobile computing devices, new auxiliary devices are being attached to the mobile computing devices. The mobile computing devices may include, for example, laptop computers, personal digital assistants (PDAs), and mobile phones, among others. The auxiliary devices may include universal serial bus (USB) drives, digital video disk (DVD) drives, compact disk (CD) drives, and moving picture expert group (MPEG) based devices, among other current and future auxiliary devices.

A mobile computing device is normally configured with a portable power source such as a rechargeable battery. The portable power source of the mobile computing device supplies the power not only to the mobile computing device, but may also supply power to an attached auxiliary device. Because the portable power source has a limited amount of power, such as when no alternating current (AC) power is available, there may be a contention for power among the mobile computing device and the attached auxiliary devices.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system is provided that includes a host system configured with a portable power source and a host power manager. The host power manager is configured to monitor an available power level of the portable power source and at least one power usage by one or more auxiliary devices. The host power manager is further configured to promote less than a full power usage by at least one of the auxiliary devices.

In one embodiment, a method for power management is provided. The method includes monitoring an available power level of a portable power source, and monitoring at least one power usage by one or more auxiliary devices. The method provides for promoting less than a full power usage by the one or more auxiliary devices.

In an embodiment, an auxiliary device is provided that includes a first component and a second component. The first component has a first power usage which is of a non-high-priority category, and the second component has a second power usage which is of a high-priority category. The auxiliary devices also includes an auxiliary power manager configured to report to a host system a status of the power usages and to support less than a full power usage by stopping the first power usage.

As mentioned above, the portable power source of the mobile computing device supplies the power not only to the mobile computing device itself, but also to the attached auxiliary devices. This may create a contention for the portable power source between the mobile computing device and the attached auxiliary devices. A sudden loss of power source may result in data loss, application interruption or other undesirable consequences, not only for the mobile computing device, but for the attached auxiliary devices as well. To address this, a user may unplug an auxiliary device to discontinue its power usage or leave the device plugged in and allow it to continue consuming power. The present disclosure provides for managing auxiliary device power and promotes no power or less than a full power usage by some devices and components in order to extend battery life and usage by higher priority devices and/or components.

Figure 1:
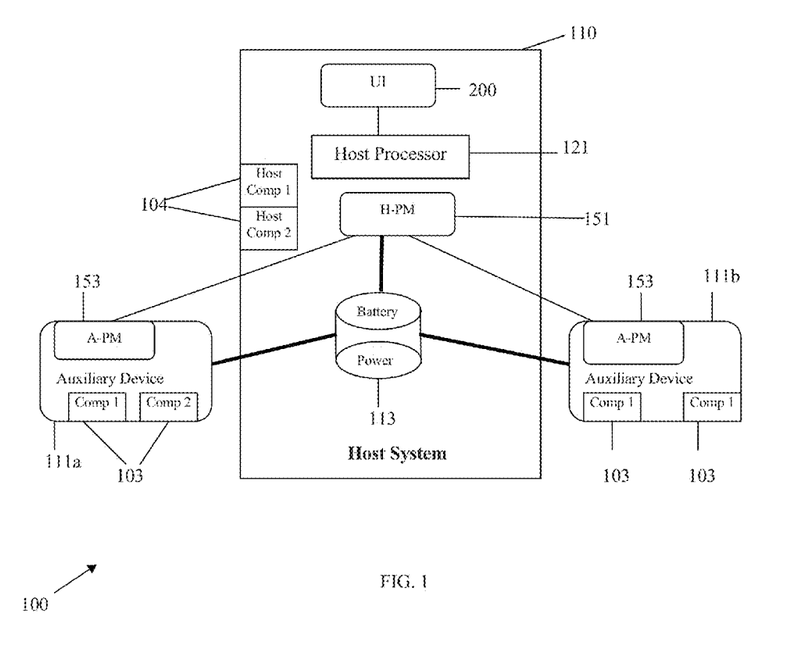
FIG. 1 illustrates an embodiment of a computing complex with auxiliary devices.

FIG. 1 illustrates an embodiment of a computing complex 100. The computing complex 100 comprise a host system 110 and a set of auxiliary devices 111 (111*a* and 111*b*). The host system 110 in turn comprises a user interface (UI) 200, a host processor 121, and a battery power source 113. The host processor 121 supports a set of components 103 and a host power manager (H-PM) 151. The auxiliary devices 111*a* and 111*b* each include an auxiliary power manager (A-PM) 153 and a set of components 103.

The host system 110 may be a mobile computing device that uses the portable power source 113. The example of the host system 110 may include a laptop, a PDA, and other hand-held computing devices that are configured with computing power to host other components and auxiliary devices. The host system 110 may communicate with or use some of the auxiliary devices. For example, if the auxiliary device 111 is a portable USB drive, the host system may use the USB drive to store data or run a program from the USB drive. The auxiliary devices 111 may depend on the host system 110 to function. For example, the host system 110 may host a USB driver for the portable USB drive to run properly. The host processor 121 may obtain its power from the portable power source 113 in order to provide the computing power for the host system 110, and to host the components 104, the H-PM 151, and other components for the host system to function properly.

The portable power source 113 supplies the power to the host system 110 and the attached auxiliary devices 111. Batteries are a common choice of the portable power source 113. Irrespective of the types of the batteries and whether the batteries are rechargeable, the battery power sources have a limited power supply, in absence of any AC power supply. Some may last longer than others, depending on the material out of which the batteries are made. For example, the older types of zinc chloride or carbon zinc, alkaline, or Nickel-Cadmium (NiCad) batteries may not last as long as the newer types of batteries such as Nickel-Metal Hydride, lithium, or fuel-cell based batteries. Multiple components or devices may draw power from the portable power source 113 at the same time. The more auxiliary devices 111 and components 103 that draw power from the power source 113, the faster the power supply would be drained.

The auxiliary device 111 are the devices that either don't have their own power or have very limited power, and depend on devices such as the host system 110 for power supply, in absence of any AC power supply. Examples of the auxiliary devices 111 may include: DVD drive, USB drive, MPEG-based devices, and CD drive, among others. Some of the auxiliary devices such as the device 111*b* may have an auxiliary power (AP) (not shown). One example of an auxiliary device with its own limited power supply is a CD player that may have its own limited battery power supply. Some auxiliary devices 111 may have their own interface (not shown), such as some of MP3 players, and thus may display the available power level of the AP. The auxiliary devices 111 are not a fixed part of the host system 110, because an auxiliary device 111 may be removed and added at any time. There may be a fixed number of the auxiliary devices 111 that can be attached to the host system 110, because of limited number of ports available on the host system 110. An auxiliary device 111 may host a number of components 103. Because of a lack of or a limited amount of computing power of its own, some auxiliary devices 111 may depend on the host processor 121 to run its component. Some auxiliary devices 111 may draw more power than others, depending on the type of the auxiliary device 111.

The components 103 may be a software application or a hardware component that may use various resources, including the portable power source 113. The component 103 may be located on an auxiliary device 111 or the host system 110. The host system 110 may include host components 104 which may use some resources of an auxiliary device 111. For example, a word processor on the host system 110 may use files stored on a USB drive. The host components 104 may be various hardware or software systems. Components 103 on auxiliary devices may use the host processor 121 on the host system to run. For example, a game on a USB drive may use the host system 110 to run. Other examples of the components 103 may include a display screen or a battery or battery charging system on an auxiliary device 111, a music player for playing songs stored on an auxiliary device 111 or on the host system 110, among many others.

The host power manager (H-PM) 151 is an application running on the host processor 121. The responsibilities of the H-PM 151 include monitoring the power usages of various components 104 on the host processor 121, and the auxiliary devices 111 by communicating with the auxiliary power manager (A-PM) 153 on the auxiliary devices 111 to get the status of power usages by each of the auxiliary devices 111. The H-PM 151 also keeps track of the available power level of the host power source 113. The H-PM 151 also interfaces with the UI 131 to display to a user the power usage status and the available power level and to receive power usage control commands from the user. The H-PM 151 may collaborate with other components of the host system 110 such as an operating system or H-PM 151 in taking a power usage control action. One example of the control actions may be stopping one or more components 104 or an auxiliary device 111.

The auxiliary power manager (A-PM) 153 may be a lightweight application residing on at least some of the auxiliary devices 111. The responsibilities of the A-PM 153 may include monitoring the power usages by various components on the auxiliary device 111, reporting the power usages to the H-PM 151, and collaborating with the H-PM 151 and other components on the auxiliary device in carrying out a power usage control action such as stopping a power usage of a particular component 103 of the auxiliary device 111. In addition, the A-PM 153 on the auxiliary device 111*b* that has an auxiliary power (not shown), may collaborate with the onboard UI (not shown) to display the device power usage status and charging status. In other embodiments, the functions of the A-PM 153 might be performed by the H-PM 151.

Figure 2:
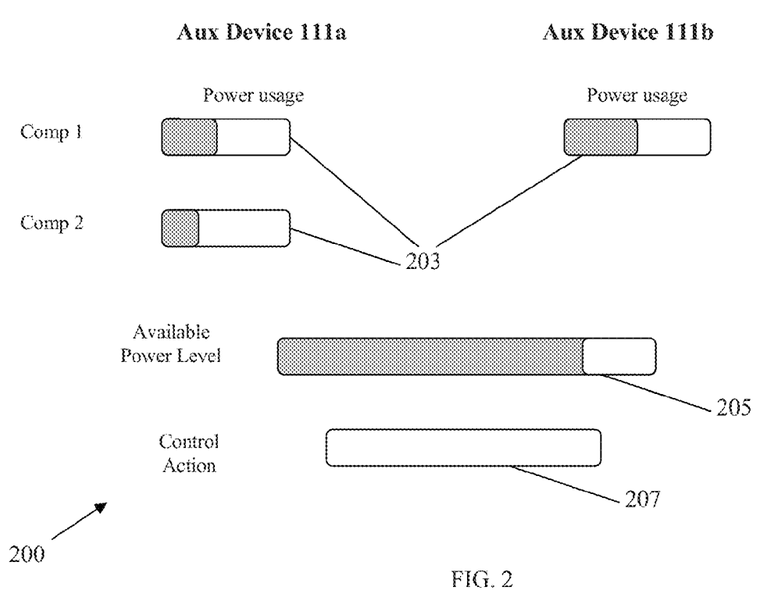
FIG. 2 illustrates an embodiment of an exemplary user interface (UI).

FIG. 2 illustrates one example of the UI 200. However other UIs with other features and options may be used and are within the spirit and scope of the present disclosure. The UI 200 is a user interface that is coupled with the host processor 121. The UI 200 may have an available power field 205 to provide a warning or a notification to a user on the available power level of the power source 113. The UI 200 may also have power usage fields 203 corresponding to each of the components 103 that are attached to the host system 110. The power usage fields 203 show the power usage of each component 103 of each auxiliary device 111. In this illustrative figure, auxiliary device 111*a* is shown having two components 103 (Comp1 and Comp2). These components 103 represent power consuming sub-systems of the auxiliary device 111*a*. For example, if the auxiliary device 111*a* were a digital audio player, Comp 1 might be a display or rechargeable battery of the auxiliary device 111*a*, and Comp 2 might be a storage medium or drive where media is stored on the auxiliary device 111*a*. To conserve the power of the power source 113, the auxiliary device 111*a* might enable shutting down (Comp 1) the display or preventing recharging of the rechargeable battery, but still promote use of (Comp 2) the storage device. This would allow a user of the host system 110 to continue to access media from the auxiliary device 111*a*, but conserve power by reducing or eliminating power consumption by Comp 1 of auxiliary device 111*a*. A myriad of other auxiliary devices 111 may be configured with any combination of components for these purposes, which will readily suggest themselves to one skilled in the art.

Auxiliary device 111*b* is shown having only one component. Therefore the only alternative to reducing the power consumption of auxiliary device 111*b* is to disable or shutdown the device completely. In some embodiments, the UI 200 might provide features to enable the user to selectively shut-down or otherwise prevent auxiliary device 111*b* from consuming power from the power source 113. The UI 200 might also have the capability to selectively re-initiate supplying power the auxiliary device 111*b*, such as when AC power is restored to the host system 110. The UI 200 may allow the user to enter a command at the control command field 207 for the H-PM 151 to help carry out various features and functionality. For example, the user may issue a command or select a button to go into a power conservation mode, and in response, the H-PM 151 may shut down certain components 103 on a priority basis in collaboration with other components of the host system 110.

The user may select sequences or prioritize the auxiliary devices 111 and/or components 103 so that when a low priority situation arises the H-PM 151 might automatically begin shutting down or promoting reducing power to the devices, such as in conjunction with the A-PM 153. In some embodiments, this process might be accomplished manually by the user via the UI 200. The UI 200 may also allow the user to zoom in on a particular auxiliary device 111 and query for the power usage status of one or more of its component 103. The UI 200 might also provide for entry of a threshold power level of the power source 113, which when reached would prompt notification of the user. The UI 200 may allow the user to set a threshold that would trigger certain control actions on the portable power source 113. For example, if a threshold of 20% is set for the available power level, then the H-PM 151 may start promoting less than a full power usage by the auxiliary devices 111, when the threshold is reached.

Figure 3:
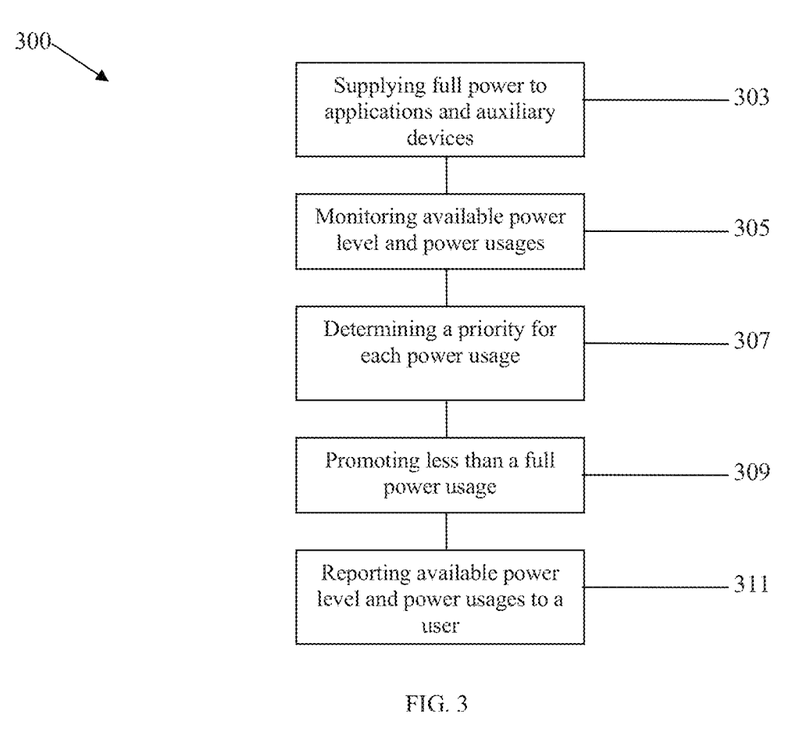
FIG. 3 illustrates an embodiment of a process of power management.

FIG. 3 illustrates an embodiment of a process 300 of portable power source management. The process 300 may comprise supplying full power to a plurality of components and auxiliary devices at block 303, monitoring an available power level and power usages at block 305, determining a priority for each power usage at block 307, promoting less than a full power usage at block 309, and reporting the available power level and the power usages to a user at block 311.

The block 303 illustrates the step of supplying full power to the components and the attached auxiliary devices 111. In a normal case where a host portable power source 113 has sufficient power, full power is provided to all components 103 on the host system 110 and to all attached auxiliary devices 111. Supplying full power may continue until a change in the status of available power occurs. One such event is that a minimum threshold for the available host power level is reached. In some embodiments, the power conservation by providing less than full power to an auxiliary device 111 might be initiated even before a threshold is reached, such as in situations when the user knows the AC power may be unavailable for some time.

The block 305 illustrates the step of monitoring the available power level and the power usages. Specifically, this step may include collecting power usage data of the auxiliary devices 111 and various components 103, aggregating power usages by various auxiliary devices 111 and the host components 110 into an aggregate usage, checking and calculating the available power level, and determining whether a predefined threshold for the available power level is reached. Part of this step may also include storing the collected power usage data for a specified duration, if a user so desires. This step may also include keeping track of the status of the auxiliary devices 111, because an existing device may be removed and a new one added at any time.

The block 307 illustrates the step of determining a priority for each power usage. Specifically, this step may include categorizing the power usages by the auxiliary devices 111 and components 103 into categories such as high or low power usage priority, based on a number of criteria. One example criterion may be based on whether stopping the power usage of an auxiliary device or a component would result in a data loss. For example, stopping a read-only component such as music player may not result in any data loss. On the other hand, stopping an online session that has an in-progress transaction may result in some data loss. Some other usages by components such as a DVD player may consume more power. The user may categorize those power usages as high-priority if the usage might result in data loss, and those power usages, low or other priorities, that are unlikely to result in data loss. The power usages may also be categorized into low-power-consuming category and high-power-consuming category, according to the amount of power resource the component and the auxiliary device may use. Some power usages by components such as a word processor may be low-power-consuming. The criterion and categories may be modified by the user, depending on specific circumstances and the design choice.

The block 309 illustrates the step of promoting less than a full power usage. When the portable power source 113 runs low and, for example, a threshold of the available power level is crossed, actions prompted by the user or automatically may be taken by the H-PM 151 to promote less than a full power usage by one or more components 103 and of one or more auxiliary devices 111a, in order to conserve power and avoid potential data or other loss because of a sudden power loss. One action may be to stop those components 103 and auxiliary devices 111 that are categorized as lower priority and high-power-consuming. For example, a component such as playing a movie on a DVD drive, which has a low risk of data loss and is high-power-consuming, may be stopped. Another option for action is to start an alternative component or device that is less power-consuming, in place of a high-power-consuming component or device at a cost of slower speed. For example, a more power-consuming flash drive may be stopped in favor of a slower, but less power-consuming internal disk drive. Another option of action may be to display to the user the power usages of each auxiliary device, component on the device, and each component, and the available power level, and allow the user to take control action manually such as stopping an auxiliary device 111 or a component 103.

The block 311 illustrates the step of reporting the available power level and the power usages to the user. Reporting the current available power level and the usages of the auxiliary devices 111 and the components 103 may take place during the whole period when the portable power source is available. The reporting may be on demand, at a fixed interval, or a combination of the two. The reporting may be through a GUI, a notification or other means.

Figure 4:
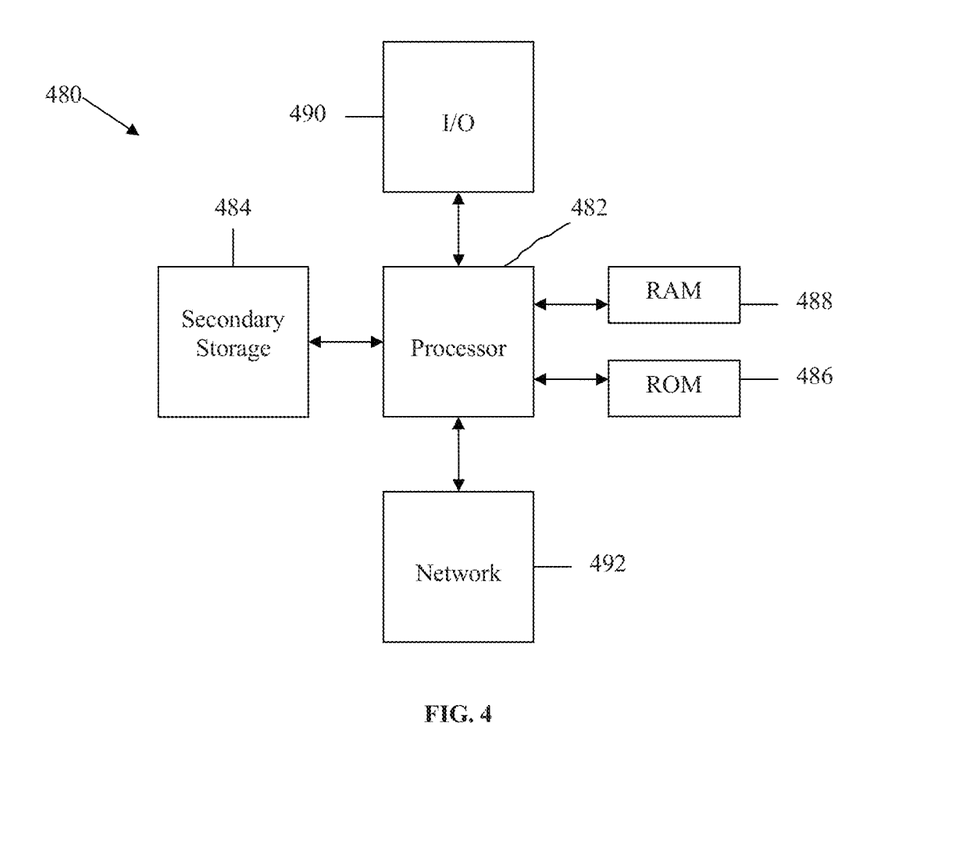
FIG. 4 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A host system comprising:
a power source configured to provide power to the host system and a first auxiliary device; and
a host power manager configured to:
monitor an available power level of the power source and a power usage level of a plurality of components of the first auxiliary device;
detect a change in status of the available power level;
perform a power usage control action, wherein the power usage control action comprises reducing power to one or more of the plurality of components of the first auxiliary device based upon the available power level and a priority of the one or more of the plurality of components of the first auxiliary device, wherein the priority is determined based on avoiding data loss with reduced power to the one or more of the plurality of components, and wherein after performing the power usage control action, the power usage level of the first auxiliary device remains greater than zero.

2. The host system of claim 1 further comprising a plurality of host components, wherein the host power manager is further configured to monitor a power usage level of the plurality of host components.

3. The host system of claim 2 further comprising a user interface, wherein the user interface is configured to receive an input and responsive to the input the host power manager performs the power usage control action to reduce power to at least one of the plurality of host components.

4. The host system of claim 1, wherein the host power manager is further configured to receive a report from the first auxiliary device, wherein the report comprises the power usage level of the first auxiliary device.

5. The host system of claim 4, wherein the power usage level comprises a power usage level of each of the one or more of the plurality of components of the first auxiliary device, and wherein the one or more of the plurality of components comprises at least one high priority component and at least one low priority component.

6. The host system of claim 5, wherein reducing power usage to the first auxiliary device further comprises maintaining power provided to the at least one high priority component and removing power from the at least one low priority component.

7. The host system of claim 1, wherein the power source is further configured to provide power to a second auxiliary device.

8. The host system of claim 7, wherein the host power manager is further configured to direct the power source to continue providing power to the second auxiliary device, after reducing the power provided to the first auxiliary device.

9. The host system of claim 7, further comprising a user interface, wherein the user interface is configured to receive an input and responsive to the input the host power manager performs the power usage control action to reduce power to the second auxiliary device.

10. The host system of claim 7, wherein the host system is a mobile computing device and the first and second auxiliary devices are attached to the mobile computing device.

11. A method comprising:
providing power to a host system and a first auxiliary device from a power source of the host device;
monitoring an available power level of the power source and a power usage level of a plurality of components of the first auxiliary device;
detecting a change in status of available power; and
performing a power usage control action, wherein the power usage control action comprises reducing the power to one or more of the plurality of components of the first auxiliary device based upon the available power level and a priority of the one or more of the plurality of components of the first auxiliary device, wherein the priority is determined based on avoiding data loss with reduced power to the one or more of the plurality of components, and wherein after performing the power usage control action, the power usage level of the first auxiliary device remains greater than zero.

12. The method of claim 11 further comprising:
monitoring power usage of a plurality of host components, wherein the host device comprises the plurality of host components.

13. The method of claim 12 further comprising:

receiving an input at a user interface; and responsive to the input, performing the power usage control action to reduce power to at least one of the plurality of host components.

14. The method of claim 11, further comprising:

receiving a report from the first auxiliary device, wherein the report comprises the power usage level of the first auxiliary device.

15. The method of claim 14, wherein the power usage level comprises a power usage level of each of the one or more of the plurality of components of the first auxiliary device, and wherein the one or more of the plurality of components comprises at least one high priority component and at least one low priority component.

16. The method of claim 15, wherein reducing power usage to the first auxiliary device further comprises maintaining power provided to the at least one high priority component and removing power from the at least one low priority component.

17. The method of claim 11, further comprising providing power to a second auxiliary device by the power source.

18. The method of claim 17, further comprising:

performing a power usage control action to continue providing power to the second auxiliary device, after reducing the power provided to the first auxiliary device.

19. The method of claim 17 further comprising:

receiving an input at a user interface; and responsive to the input, reducing power to the second auxiliary device.

20. The method of claim 17, wherein the power source is comprised in a mobile computing device, and wherein the first and second auxiliary devices are attached to the mobile computing device.

* * * * *